United States Patent [19]
Deutsch et al.

[11] Patent Number: 6,028,922
[45] Date of Patent: Feb. 22, 2000

[54] SYSTEM FOR DEFERRED CALL ANSWERING IN A TELECOMMUNICATIONS SYSTEM

[75] Inventors: Douglas Anthony Deutsch, Aurora; Mary Rita Otto, Lisle; Douglas William Varney, Naperville, all of Ill.

[73] Assignee: Lucent Technologies Inc., Murray Hill, N.J.

[21] Appl. No.: 08/922,856

[22] Filed: Sep. 3, 1997

[51] Int. Cl.[7] ................................................ H04M 3/48
[52] U.S. Cl. ........................................ 379/211; 379/88.21
[58] Field of Search .......................... 379/88.2, 88.19, 379/201, 211, 210, 212, 215, 67.1, 207, 213, 214, 265, 266, 162, 163, 164, 88.21, 127, 142

[56] References Cited

U.S. PATENT DOCUMENTS

| | | | |
|---|---|---|---|
| 4,893,329 | 1/1990 | O'Brien | 379/88.23 |
| 4,924,496 | 5/1990 | Figa et al. | 379/142 |
| 5,007,076 | 4/1991 | Blakley | 379/88.21 |
| 5,029,196 | 7/1991 | Morganstein | 379/88.23 |
| 5,309,512 | 5/1994 | Blackmon et al. | 379/210 |
| 5,311,576 | 5/1994 | Brunson et al. | 379/88.26 |
| 5,408,528 | 4/1995 | Carlson et al. | 379/211 |
| 5,425,091 | 6/1995 | Josephs | 379/201 |
| 5,436,937 | 7/1995 | Hanson | 379/266 |
| 5,661,790 | 8/1997 | Hsu | 379/209 |
| 5,668,861 | 9/1997 | Watts | 379/201 |
| 5,724,411 | 3/1998 | Eisdorfer et al. | 379/93.23 |
| 5,757,897 | 5/1998 | LaBarbera et al. | 379/165 |
| 5,764,746 | 6/1998 | Reichelt | 379/207 |

*Primary Examiner*—Scott Weaver
*Attorney, Agent, or Firm*—Dennis J. Williamson; Jack R. Penrod

[57] ABSTRACT

The called party can temporarily defer answering a call simply by pressing a button on the station set. When the button is pressed, the called party's station set sends a data message to the system's voice response unit directing the voice response to play a "please wait" message to the calling party rather than sending the calling party to the called party's voice mail. The voice response unit plays the "please wait" message to the calling party and sends a call park message to the switching system hosting the station set. The call park message to the switching system directs the switching system to park the call at a specific location as is known in the art and a corresponding call park message to the station set transmits the location of the parked call to the station set. When the called party desires to answer the call, a message is sent from the station set to the switching system requesting that the call parked at the identified location be connected to the station set. The call can then be connected without the existing call being interrupted and the third party knowing of its existence.

16 Claims, 2 Drawing Sheets

SYSTEM FOR DEFERRED CALL ANSWERING IN A TELECOMMUNICATIONS SYSTEM

BACKGROUND OF THE INVENTION

The invention relates generally to a telecommunications networks having voice response systems such as voice mail and, more particularly, to a system for screening and deferring the answering of incoming calls.

It will be understood that the typical telecommunications network consists of a switching system connected to other switching systems in the public switched telephone network where selected ones of the switching systems are connected to customer premise equipment such as telephone sets, terminals, personal computers or the like. To provide voice mail (i.e. the ability for a calling party to leave a personal recorded message for a called party) and other voice response services a switching system is typically connected to a voice response unit consisting of a voice messaging platform, announcement platform and control unit. The switching system also may have access to an advanced intelligence platform for providing calling party identification information.

In existing systems, an incoming call from a calling party to a called party generally can be treated in one of three ways. First, the called party can answer the call by going off-hook such that a connection is established between the calling and called parties. Second, the call can be switched to the voice messaging platform of the voice response system allowing the calling party to leave a recorded message that can be retrieved by the called party at a later time. The calling party is switched to the voice response system if the called party does not go off-hook after a predetermined period (the called party can be on another line or not answering his or her telephone) or the calling party may be allowed to access the called party's voice mail by dialing a predetermined digit sequence. Third, the called party could conference the calling party into an existing call by initiating the switching system's conference circuit as is well known.

In order to avoid "losing" the incoming call, existing prior art systems require that the called party must go off-hook and answer the incoming call before the calling party is switched to voice mail or terminates the connection by going on-hook. If the called party is currently connected to a third party, this requires that the current caller must be placed on hold before the incoming call can be handled. Thus, the third party is made aware that the called party has received another call and must be put on hold. The called party must then juggle two "live" calls. Such a scenario is frustrating for the called party and third party and is inconvenient for the calling party.

Thus, a system that allows a called party to screen an incoming call and temporarily defer answering the incoming call without putting a currently connected party on hold and that efficiently uses network resources is desired.

SUMMARY OF THE INVENTION

In the system of the invention, the called party can temporarily defer answering an incoming call without interrupting an existing call. Specifically, when a calling party makes a call, the identification of the calling party is provided at the called party's station set. The called party can request that the calling party be parked and temporarily defer answering the call simply by pressing a button on the station set. When the button is pressed, the called party's station set sends a data message to the system's voice response unit directing the voice response to play a "please wait" message to the calling party rather than sending the calling party to the called party's voice mail. The voice response unit plays the "please wait" message to the calling party and sends a call park message to the switching system hosting the station set The call park message directs the switching system to park the call at a specific location as is known in the art and a corresponding call park message transmits the location of the parked call to the station set. When the called party desires to answer the call, a message is sent from the station set to the switching system requesting that the call parked at the identified location be connected to the station set The call can then be connected without the existing call being interrupted and the third party knowing of its existence.

DESCRIPTION OF THE INVENTION

Figure 1:
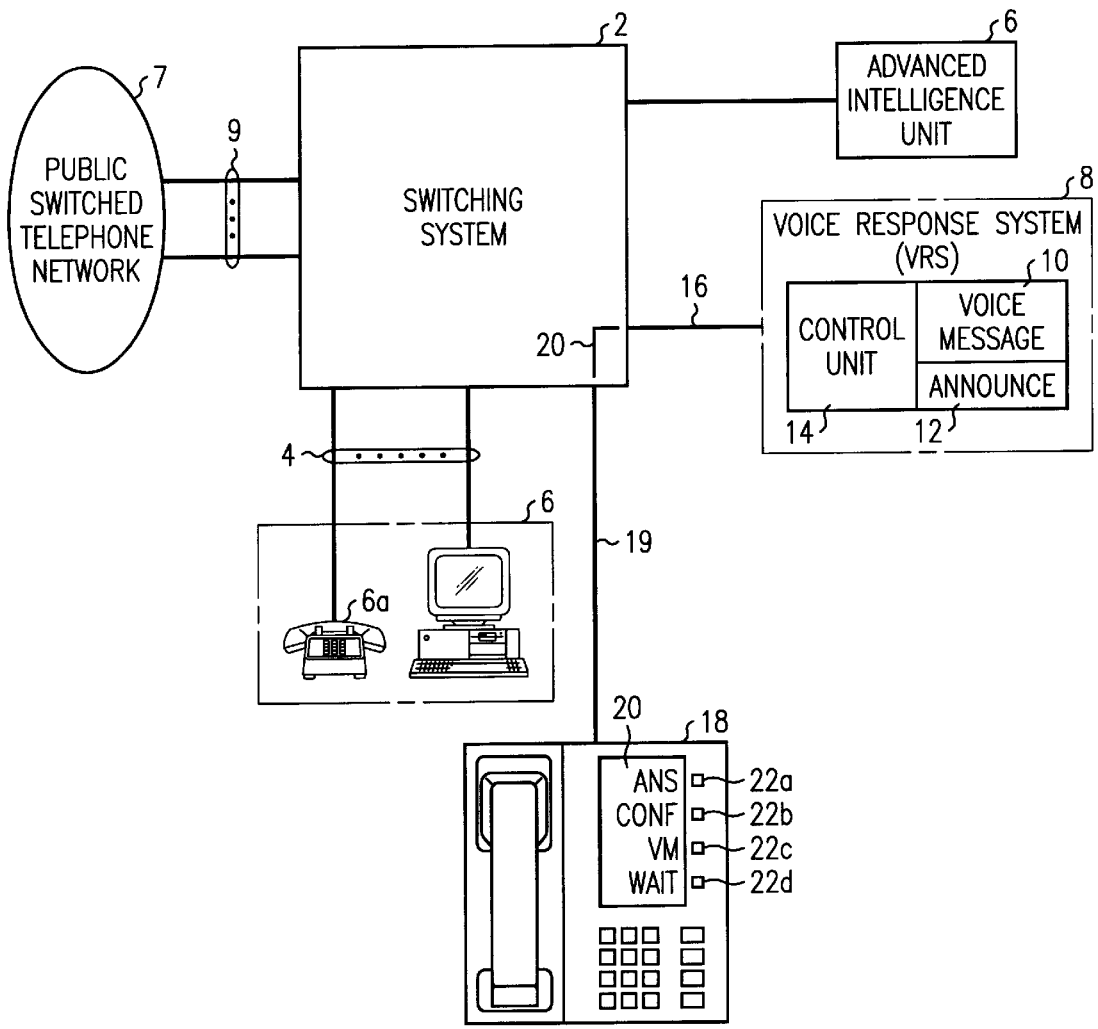
FIG. 1 is a schematic view of a telecommunications system supporting the system of the invention.

Referring more particularly to FIG. 1, a telephone network in which the system of the invention can be used is illustrated including a switching system 2 capable of hosting ISDN (Integrated Services Digital Network) interfaces. Switching system 2 can consist of a 5ESS® switch manufactured and sold by Lucent Technologies Inc. or any similar switch. Switching system 2 hosts a number of customer lines 4 that are connected to customer premise equipment 6 such as telephones, personal computers, terminals or the like. Customer lines 4 can support analog or digital traffic, ISDN or the like or any combination thereof. Switching system 2 is connected to other switching systems in the public switched telecommunications network 7 over interoffice trunks 9. In a preferred embodiment switching system 2 can access advanced intelligent unit (AIU) 6 such as the Advanced Communications Platform (ACP) sold by Comnet International for providing caller identification information. Other systems can be used to provide the caller identification information either integrated with the switching system 2 or as a separate unit as illustrated. These systems typically use the calling party's telephone number or an automatic number identifier (ANI) received from one of the switching systems in the network to query a data base and obtain pertinent calling party information that is relayed back to the switching system 2.

Switching system 2 also accesses a voice response system 8 such as the Intuity™ voice response system manufactured and sold by Lucent Technologies Inc. over primary rate interface (PRI) 16. Other interfaces between the voice response system 8 and switching system 2 can be used such as analog voice trunks and/or lines. The voice response system 8 consists of a voice messaging platform 10 and an announcements platform 12 controlled by a processor based control unit 14. The voice response unit 8 operates as is known to provide voice announcements to callers in a wide variety of applications and to obtain and record voice messages (voice mail) via switching system 2.

Switching system 2 is also connected to an ISDN telephone set 18 with soft displays such as a Lucent 8520 telephone set manufactured and sold by Lucent Technologies Inc. Telephone set 18 is connected to switching system 2 over an ISDN interface 19. It will be appreciated that the standard ISDN interface consists of 2 B-channels for transmitting voice and data, a D-channel for transmitting user data and status and control messages (2B+D) where each B-channel has a rate of 64 Kbps and the D-channel operates at a rate of 16 Kbps. User data in the form of data packets is typically transmitted over the D-channel using the standard X.25 protocol although other protocols can also be used.

The ISDN telephone set 18 includes a "soft" visual display 20 having a plurality of user actuated buttons 22a–22d adjacent the display. The display is "soft" in that the display can change such that any particular button can serve to initiate different functions based on the context of the situation. The telephone set 18 is processor controlled such that the display defines the function controlled by a particular button for that scenario. The display shows the name and telephone number for the calling party of an incoming call and lists call treatment options for controlling that call. For example, the called party can depress button 22a to answer the incoming call, button 22b to conference the incoming call with an existing call or button 22c to send the incoming called to the called party's voice mail in voice message system 8.

Figure 2:
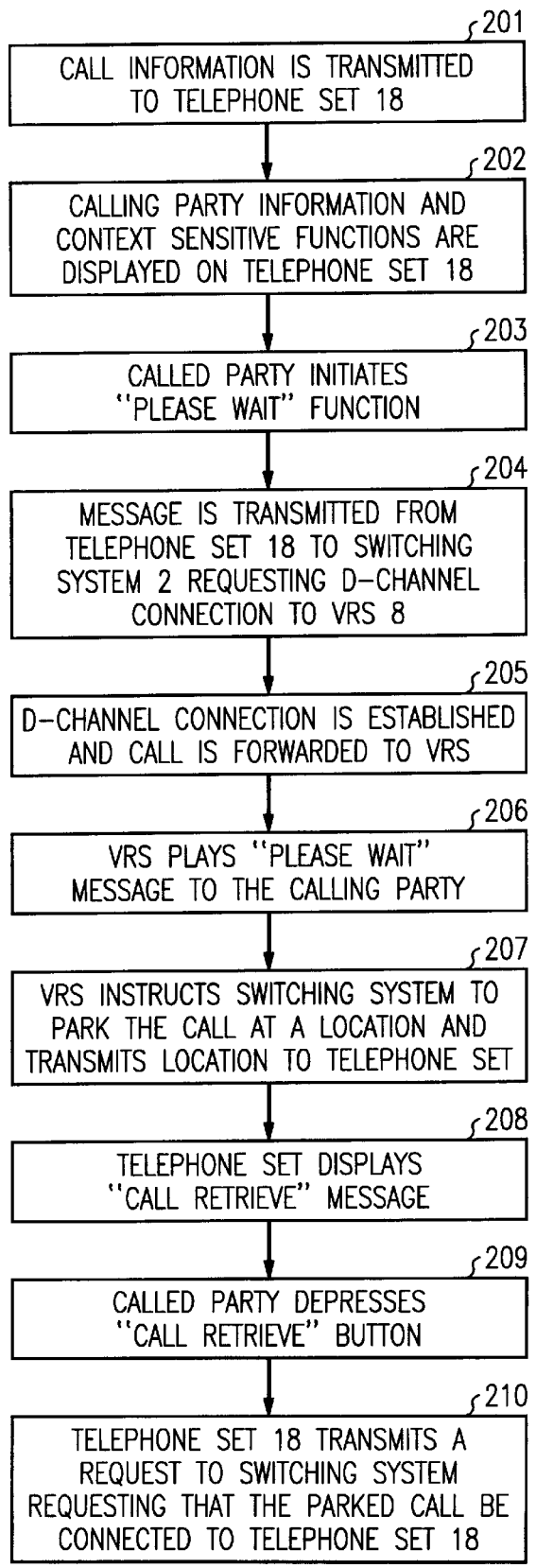
FIG. 2 is a flow chart showing the operational steps of the system of the invention.

In addition to these known operations, the called party can depress button 22d to send an announcement to the calling party requesting that the calling party wait for the called party to answer in accordance with the system of the invention. Operation of the system of the invention will now be described with reference to FIGS. 1 and 2. For purposes of explanation assume that the party associated with telephone set 18 (the called party) is on an existing call with a third party. When another call is made to telephone 18 from a calling party (i.e. telephone 6a) the switching system retrieves calling party information from AIU 6 or from another source and transmits the call information to telephone set 18 over the D-channel of ISDN interface 19 (block 201). The calling party information and the context sensitive functions are displayed on soft display 22 of telephone set where each functional activity is associated with one of buttons as shown in FIG. 1 (block 202). While in a preferred embodiment calling party information is retrieved from AIU 6 and displayed at telephone set 18, it will be appreciated that the system of the invention can operate without this information.

If the calling party information, such as calling party name, cannot be obtained and displayed to the called party based on the AIU 6, it is contemplated that the system provide an identify function. In this scenario, an "identify" function would be displayed on soft display 22 in association with one of buttons 22a–22d. Depression of the associated "identify" button sends a message to voice response system 8 over the D-channel connection thereby invoking the identify finctionality. Specifically, the voice response system 8, in response to this message, makes an announcement to the calling party requesting the calling party's identity. The calling party speaks his or her name and the voice response system 8, using existing speech to text conversion technology, converts the spoken identity into text data This data can then be transmitted over the D-channel connection to telephone set 18 where it is displayed to the called party. The called party can then make a disposition decision for the call based on the calling party's identity.

The called party initiates the "please wait" functionality of the invention by depressing button 22d associated with this function (block 203). When the "please wait" button 22d is depressed, a message is sent from the telephone set 18 to switching system 2 over the D-channel requesting that a D-channel connection be established between the telephone set 18 and voice response system 8 and that a "please wait" message should be announced (block 204). Alternatively, a permanent virtual circuit (PVC) could carry these messages. The switching system 2, in response to that message, establishes a D-channel connection 20 between the telephone set 18 and voice response system 8 and forwards the call to the voice response system 8 (block 205). It is to be understood that the capability of a switching system to forward a call from a first destination (the telephone set 18) to a second destination (the voice response system 8) is well known and is not dependent on the D-channel connection between the telephone set 18 and voice response system 8.

The voice response system 8 plays a "please wait" announcement for the calling party that is maintained as part of the voice response service of the announcements platform 12 associated with the called party (block 206). In this manner the "please wait" message can consist of a recorded personalized announcement stored and played in a manner similar to that of voice mail announcements. Further, the specific message announced can be different based on the calling party number such that particular calling parties can receive messages personalized for the individual. It is contemplated that the message delivered would state "Please wait. The called party will be with you momentarily." or a similar message. The voice response system 8 also instructs the switching system 2 to park the call at a particular location and informs telephone set 18 of the location at which the call is parked (block 207). It is to be understood that the call park feature is provided on commercially available switches such as the 5ESS® switching system manufactured and sold by Lucent Technologies Inc. to retrieve calls for virtual addressing where the call is retrieved using a virtual address. At this point, the calling party's call is parked at the switching system 2 and the called party remains connected to the third party. Significantly, the third party is not informed of the incoming call from the calling party and has not been placed on "hold."

When the voice response system 8 transmits the message to telephone set 18 informing it of the location of the parked call, the telephone set displays a message associated with one of the buttons (e.g. button 22d) informing the called party that the parked call can be retrieved by pressing that button (block 208). When the called party wishes to retrieve the parked call (e.g. after the existing call with the third party is terminated), the called party depresses the button (block 209). The telephone station 18 transmits a message to switching system 2 requesting that the parked call be connected to telephone set 18 and informing the switching system 2 of the location of the parked call as provided by the voice response system (block 210). Because telephone set 18 is a processor based intelligent CPE, it maintains an internal script for all of the details of the above-described messaging. Specifically, the internal script of telephone set 18 maintains the parked call location and the messaging protocol necessary for transmitting the location and requesting connection of the parked call to the telephone set. When the called party depresses the appropriate button, this script is followed and the appropriate messages are delivered to switching system 2 over the D-channel of ISDN interface 19. The called party need only be informed via display of that information necessary to make the appropriate decisions and depress the appropriate buttons.

In addition to deferring answering of a call as described above, the system of the invention can also be used to disconnect an incoming call. Specifically, after the identity of the calling party is displayed at telephone set 18 as previously described, depressing a "disconnect" function button transmits a disconnect message to the voice response system 8 over the D-channel connection. In response to this message, the voice response system 8 instructs switching system 2 to terminate the connection to the calling party. Because the disconnect message goes through the voice response system 8, the termination of the call can be preceded by an announcement such as "I am busy, I will call you back" or "I am not interested, Thank you." It is contemplated that a disconnect with recorded message is particularly useful for unwanted calls such as solicitations or harassing calls.

While a preferred embodiment of the invention has been described where telephone set 18 is an ISDN interface, it will be understood that an analog display telephone using Analog Display Services Interface (ADSI) may also be used. If such a telephone set and interface is used, switching system 2 is programmed to present the incoming notification display and the calling party information display on the telephone set. Using the ADSI technology the switching system must also be programmed to recognize a button press on the telephone set as a request to connect to the voice response system 8. While the preferred embodiment discloses using a "call park" feature for holding the call, similar finctionality could be achieved using the automatic call distributor (ACD) functionality "queuing to an announcement", that is currently used to perform the finctionality where calls are queued waiting for an available operator and a message such as "all operators are busy, please wait and we will answer your call as soon as possible" is provided. Finally, the "please wait" functionality of the present invention can be used in conjunction with the queuing capability of the existing ACD systems. As a result, multiple calls would be queued by the calling party using the "please wait" flnction of the invention where the queued calls are answered in sequence.

Thus, the system of the invention allows a called party to defer answering a call or disconnect a call without alerting existing calls or placing existing calls on hold. This allows the called party to handle the calls more professionally and efficiently. Moreover, the existing system efficiently uses switch resources and avoids use of resource intensive transfer circuits. It is to be understood that the above description is only of one preferred embodiment of the invention. Numerous other arrangements may be devised by one skilled in the art without departing from the scope of the invention. The invention is thus limited only as defined in the accompanying claims.

What is claimed is:

1. A method for deferring the answering of an incoming call from a calling party, comprising the steps of:

transmitting an announcement to the incoming call at a customer premise equipment;

forwarding the incoming call at a switching system to a voice response system;

playing a message to the calling party;

parking said incoming call at a location in said switching system and transmitting said location to said customer premise equipment;

transmitting a request from said customer premise equipment for said call; and connecting said incoming call to said customer premise equipment.

2. The method of claim 1, wherein the step of transmitting an announcement includes the step of transmitting over an ISDN interface.

3. The method of claim 1, wherein said announcement includes calling party information.

4. The method of claim 3, wherein said calling party information includes the calling party's name and telephone number.

5. The method of claim 3, wherein the calling party information is obtained from an advanced intelligence data base.

6. The method of claim 1, wherein said step of parking said incoming call includes the steps of transmitting a request for parking the call from the voice response system to the switching system including an identification of the call park location.

7. The method of claim 1, wherein the step of transmitting a request includes the step of transmitting said location to said switching system.

8. The method of claim 1, wherein the step of connecting said incoming call is performed in said switching system.

9. The method of claim 1, wherein said customer premise equipment includes an ISDN telephone set.

10. The method of claim 1, wherein said ISDN telephone set is connected to the switching system over an ISDN interface including a channel for delivering control messages.

11. The method of claim 1, wherein the control messages are sent using X.25 protocol.

12. The method of claim 1, wherein the step of transmitting a request includes the step of transmitting over an ISDN interface.

13. A method for deferring the answering of an incoming call from a calling party, comprising the steps of:

transmitting an announcement to the incoming call to a decision maker at a customer premise equipment;

in response to a direction of said decision maker forwarding the incoming call at a switching system to a voice response system;

playing a message to the calling party;

parking said incoming call at a location in said switching system and transmitting said location to said customer premise equipment;

transmitting a request from said customer premise equipment for said call; and connecting said incoming call to said customer premise equipment.

14. The method of claim 13, wherein the step of forwarding the incoming call is made in response to a direction of a decision maker who is a called party.

15. The method of claim 13, wherein the step of forwarding the incoming call is made in response to a direction of a human decision maker.

16. The method of claim 13, wherein the step of forwarding the incoming call is made in response to a direction of a decision maker based on said announcement which includes calling party information.

\* \* \* \* \*